J. D. TEW.
METHOD OF MAKING HOLLOW CORD.
APPLICATION FILED DEC. 11, 1916.
1,245,067.
Patented Oct. 30, 1917.
2 SHEETS—SHEET 2.
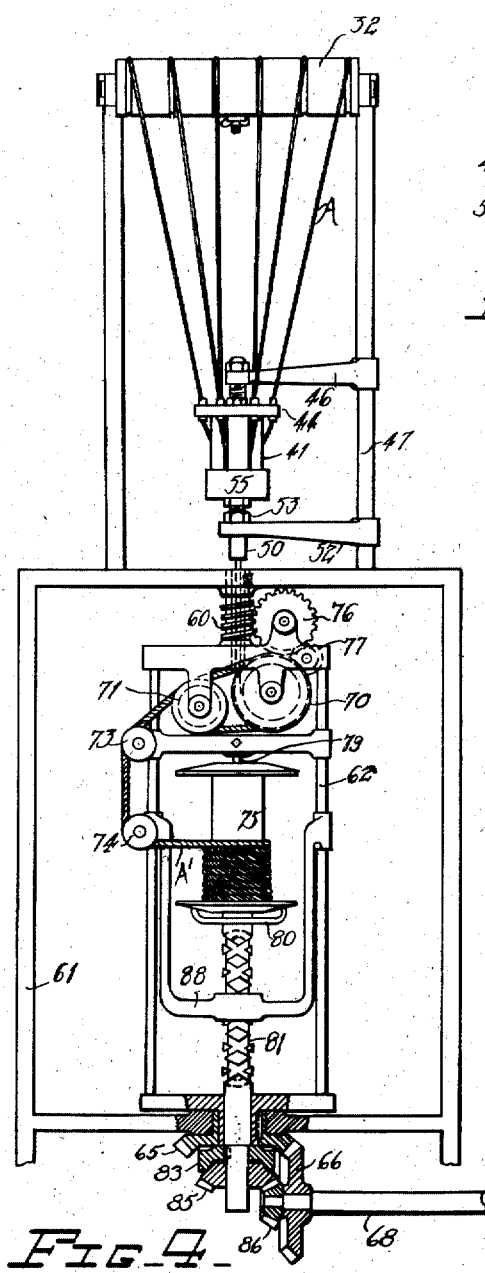
Fig. 4.
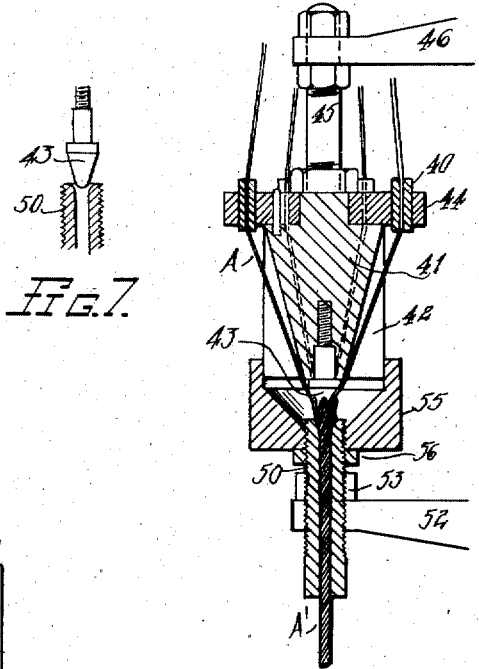
Fig. 7.
Fig. 5.
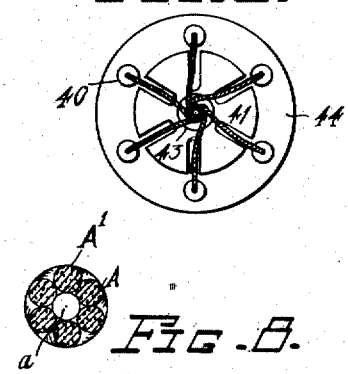
Fig. 6.
Fig. 8.
INVENTOR.
James D. Tew,
BY Baker Macklin
ATTY'S.

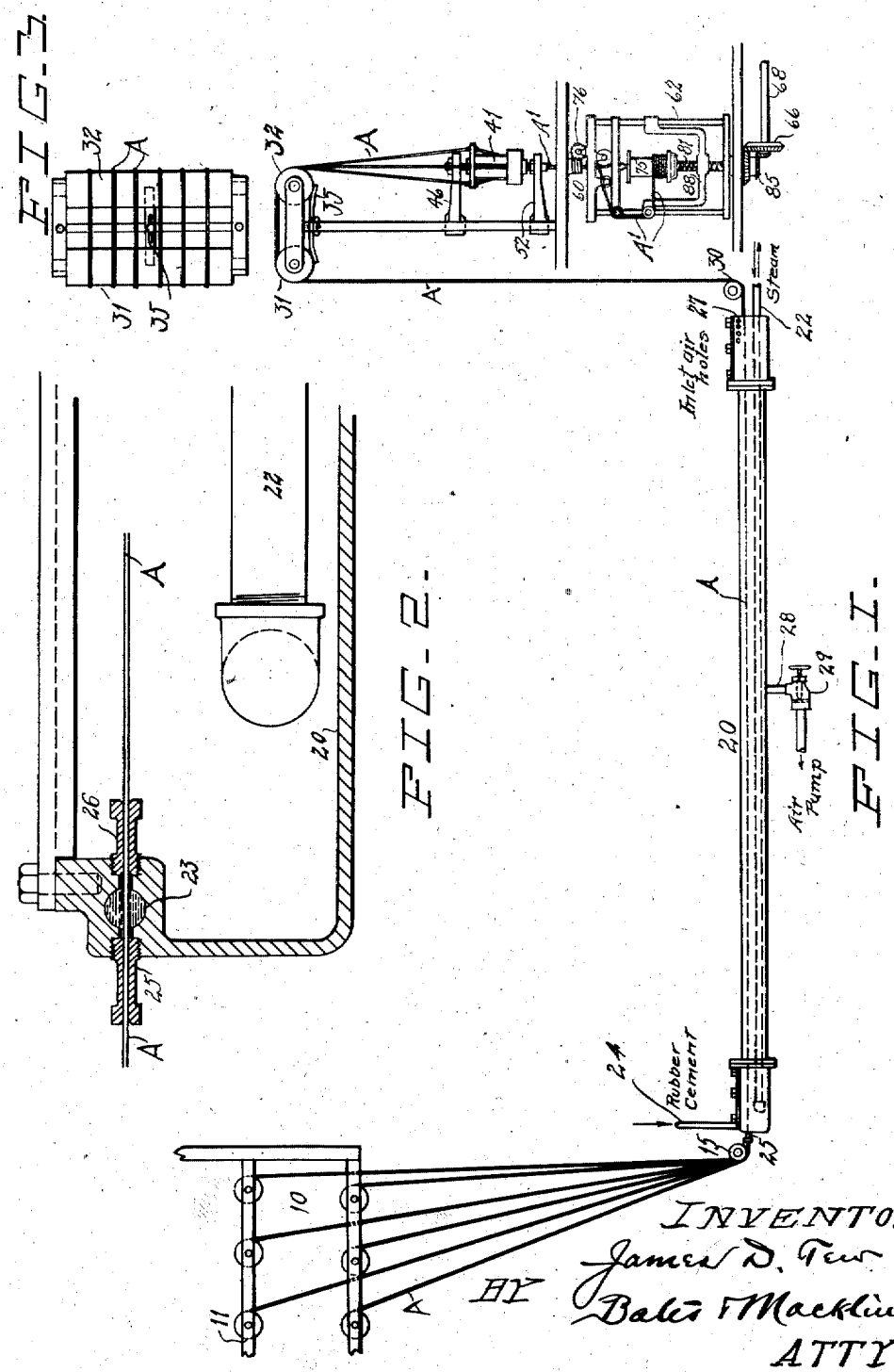

UNITED STATES PATENT OFFICE.

JAMES D. TEW, OF AKRON, OHIO, ASSIGNOR TO THE B. F. GOODRICH COMPANY, OF NEW YORK, N. Y., A CORPORATION OF NEW YORK.

METHOD OF MAKING HOLLOW CORD.

1,245,067.     Specification of Letters Patent.     Patented Oct. 30, 1917.

Application filed December 11, 1916. Serial No. 136,190.

*To all whom it may concern:*

Be it known that I, JAMES D. TEW, a citizen of the United States, residing at Akron, in the county of Summit and State of Ohio, have invented a certain new and useful Improvement in Methods of Making Hollow Cord, of which the following is a full, clear, and exact description, reference being had to the accompanying drawings.

My Patent No. 1,444,079, shows and claims a hollow cord composed of adhering textile strands twisted together. Such a cord may be laid in a round shape and then readily flattened to spread laterally to a greater or less extent and thus closely fill the space available for it. These more or less flattened cords may accordingly readily compose a continuous ply or layer adapted for use as an effective strengthening member in a tire casing, rubber hose, or other place.

The present invention is concerned with a process of making such hollow cord. I have found that the cord may be manufactured cheaply and rapidly by treating individual textile strands with rubber cement, so as to impregnate and coat them, and thereafter, while the rubber cement is in a sticky condition on the outside of the strands, to twist a number of them together about a needle or forming point, and at the same time pull the nascent cord along through a tubular die which may press the strands together without filling the center, while a tension is maintained on the strands sufficient to keep them taut, but not great enough to cause the cord being formed to collapse at the center.

In the preferred method of carrying out my process I heat the cords and dry them immediately after the rubber treatment, sufficiently to do away with free liquid or loose cement on the surface, but without baking the cement into a hard coating. Then I take the strands from the drier, and, while maintaining them separate, lead them to a twisting apparatus. I may provide the necessary tension on the strands by friction at the guide rollers, over which they pass in going from the drier to the twisting apparatus. In the twisting apparatus I guide the strands individually, bringing them together about the forming needle, which needle projects into the bore of the cord being formed a sufficient distance to prevent the cord collapsing until the strands have each adhered to the adjacent strands, the series of strands thus acting after the manner of an arch about the opening, and their adherence preventing any of them passing inwardly to occupy the bore. While the cord is in this forming or nascent condition it is drawn through the tubular die which has a bore of such size that it will press each strand into close contact with its neighbors (*i. e.* the adjacent cords on its opposite sides) while leaving the center unoccupied.

A sufficient number of strands must be employed so that they may come into close contact with each other and still leave a bore in the center. I have found that six strands may readily accomplish this result. I have also used eight strands satisfactorily. Where six strands are employed the diameter of the tubular die is substantially three times that of the diameter of each strand, thus leaving a bore of a diameter substantially equal to that of a strand. If a greater number of strands are employed, the diameter of the die will be correspondingly increased.

I use the term "strand" herein as meaning one of the constituent elements which are twisted together to form the hollow cord. Such strand may itself be a twisted cord. I produce very satisfactory results, for example, by employing as the strand solid cord composed of four threads twisted together, each thread being made of three yarns twisted together. The number of individual elements and twistings used in making the strand-cord may be varied as desired. It is necessary, however, in making the hollow cord to have a large enough number of strands so that the series of strands may make a complete closed band or arch about the central opening, each strand being held from passing into the bore by the two adjacent strands. Every section of every strand therefore acts after the manner of a voussoir of an arch.

Without intending to limit myself to specific proportions I may say that I have accomplished very satisfactory results by supplying an amount of rubber cement which by weight is approximately half the weight of the strands constituting the cord. I find that a tension on each strand equivalent to a weight of about one pound accomplishes the desired result of keeping them taut without causing collapse at the center of the cord.

My invention is hereinafter more fully explained in connection with drawings illustrating a convenient form of apparatus which may be employed. The essential characteristics of the invention are summarized in the claims.

In the drawings, Figure 1 is a side elevation, somewhat diagrammatic, of the apparatus; Fig. 2 is an enlarged sectional side elevation of a portion of the apparatus, illustrating a device which may be employed for treating the strands with rubber and heating and drying; Fig. 3 is a plan of some of the roller guides over which the strands pass from the drying to the twisting device, which may be employed in my process; Fig. 4 is a side elevation of a suitable twisting device; Fig. 5 is an enlarged vertical section of a portion of the twisting device, showing particularly the die and needle or inside former; Fig. 6 is a horizontal cross section through the twisting device above the die and former; Fig. 7 is a side elevation of the forming point and tubular die in substantially the position they mutually occupy in use; Fig. 8 is a cross section on an enlarged scale of an illustrative hollow cord produced by this process.

The drawings show a cord made of six strands, which number I find very satisfactory for many purposes. In Fig. 1, 10 designates a suitable creel in which are shown six spools 11, from which lead six strands A. These strands are shown as passing downwardly across the under side of a guide roller 15 into and through a long horizontal drying and heating chamber 20. In the wall of its entrance end this chamber has a receptacle 23, into which liquid rubber cement is pumped through a pipe 24, communicating therewith. This receptacle is in open communication with two sets of hollow nipples 25 and 26. Each set of nipples is arranged in a horizontal row and the two corresponding nipples in the two sets are in alinement. There are as many nipples in each set as there are strands A. The nipples 25 are shown as projecting outwardly beyond the end of the wall of the casing and the nipples 26 projecting inwardly, as shown in Fig. 2. By this means the strands as they are drawn through these nipples are impregnated and coated with the rubber cement under pressure.

As the strands emerge from the nipples 26 they are heated and dried. A convenient drier consists of a steam pipe 22 in the casing. The strands are stretched approximately horizontally in the upper portion of the chamber, out of contact with the steam pipe, and pass out through the other end of the chamber. Suitable air vents are provided into the chamber, as indicated by the holes 27. The air in the chamber is continuously withdrawn by an air pump, applying suction to a pipe 28 communicating with the chamber. A suitable valve 29 in this pipe (which may conveniently have a screw-threaded needle coacting with a diaphragm 29 having a small hole through it) controls the exit of air so that the air is substantially saturated with rubber solvent (benzol, for example) when it is withdrawn. The surplus solvent is carried out by the air and may be taken to a suitable recovery apparatus.

The length of the drying chamber, the speed of progress of the strands, and the degree of heat supplied by the steam pipe, are so regulated that the strands are substantially dry when they emerge from the apparatus, but the rubber on the surface thereof is of a very sticky nature. I have found it satisfactory to provide a drying chamber about twenty feet long, to progress the cords therethrough at a speed of about sixteen feet per minute, and to supply heat to the chamber of approximately 130° Fahrenheit, though these proportions may be varied in practice, as the conditions require.

As the cords emerge from the drying chamber they pass across a guide roller 30, and then, while still separate from each other, pass across other guide rollers, as 31 and 32 in the drawings, to the twisting device. It is important that the tension of the strands be comparatively light, otherwise the twisting mechanism would exert such a pull on the strands as to collapse the cord. On the other hand, the strands must be kept taut to make them properly twist. Some drag is provided to the strands by the nipples where they pass through the impregnating solution, and a further drag by the friction at the guide rollers, across which the sticky strands run. A further drag may readily be provided by establishing an increased friction against the rotation of any of the guide rollers. I have illustrated for this purpose a leaf spring 35, which may be pressed by a thumb nut against the rollers 31 and 32. This, however, is purely illustrative of any regulated friction device.

The strands A pass downwardly from the roller 32 through suitable guides 40, held equidistantly about a center, and below these guides they converge about a central core 41, which has longitudinal grooves 42 in its periphery, and thence come into contact with the inside forming point or needle 43, carried by the core 41. Directly opposite this forming point is a tubular die 50, the bore of which corresponds to the external diameter of the completed core. The die is rounded at its entrance end and the forming point terminates adjacent to that end, preferably slightly within it. Below the die is a suitable twisting and winding mechanism to twist the cord and spool it.

The die and forming point are carefully adjusted with reference to each other, so that the strands are supported out of central contact while they are twisted into a cord at the entrance to the die. When thus twisted the adhesion of each strand to its neighbors prevents any strand passing inwardly to the center. A' indicates the formed cord. Fig. 8 is an enlarged diagrammatic view of a cross section of this cord, and shows how the contiguous strands form in effect an arch about the hollow center $a$.

As shown in the drawings, the central core 41, which carries the forming needle, is supported by a threaded shank 45, adjustably clamped to an arm 46 carried by the upright support 47. The guides 40 for the individual strands are shown as bushings mounted in a disk 44 clamped to the top of the central core 41. The die 50 is shown as threaded in a stationary arm 52. This allows vertical adjustment of the die. 53 indicates a lock nut for this die. The die is also shown as carrying a collar 55, locked by a nut 56. The upper end of this collar has a recess which closely embraces the walls of the central bore 41 and thus insures axial alinement of the forming point and tubular die.

The construction last above described may be varied in practice, so long as the proper adjustment is provided between the inside former and the tubular die, and the strands are kept out of contact with each other until they are twisted about the point adjacent to the mouth of the die. By thus keeping them out of contact, so that they do not adhere to each other until they are brought together, twisting them about the point just as they pass into the tubular die which has an interior bore confining the exterior of the cord without collapsing it, and by drawing the cord along through this die while a light tension is kept on the strands, and performing this operation while the strands are still sticky from the rubber—these correlated operations cause the production of a tubular cord A', composed of adhering textile strands and having sufficient stiffness to remain round while being wound on a spool, or thereafter laid in place, while the cord may thereafter be readily flattened, as desired, for the manufacture of tire casings, or other articles.

Any suitable mechanism may be employed to draw and spool the finished cord. The drawings show a common form of winding mechanism for this purpose, which I will now describe with particular reference to Fig. 4.

Below the tubular guide 50, and alined with it, is a stationary tubular member 60, carried by a stationary frame 61. On the surface of this tubular member are formed the teeth of a worm. The tubular member extends below the worm, forming a bearing which guides the upper end of a rotatable frame 62, mounted at its lower end in the frame 61. As shown the lower end of the rotatable frame is keyed to a bevel gear 65, journaled in the frame 61, and driven by a bevel gear 66 in the end of a suitable drive shaft 68.

The rotatable frame 62 carries a pulley 70 having a grooved surface, and the cord comes through the tubular member 60, carrying the worm, and onto this grooved pulley, passes once around the same and over a grooved pulley 71, and then back over the pulley 70, then again over the pulley 71, over pulleys 73 and 74 and onto a spool 75. The stationary worm 60 is engaged by a worm wheel 76 carried by the frame, which transmits motion to a gear 77 meshing with gear teeth rigid with the pulley 70, thereby rotating this pulley 70 to draw the cord downwardly as the frame 62 is rotated. The passing of the cord twice around the pulley 70 causes the same to frictionally grip this pulley, which provides for drawing this cord downwardly.

The spool 75 on which the cord is to be wound, has its upper end engaging a pivot center 79 and the lower end is supported on a fork 80, on the upper end of a shaft 81. The pivot center is locked by a set screw which may be loosened, allowing the center to be moved upwardly when it is desired to remove the spool. The shaft 81 passes axially through the gear 65, and is adapted to rotate independently of the gear and the frame. At the lower end of the shaft is carried a friction clutch member 83, rigid on the shaft, through which motion may be transmitted from a bevel gear 85 loosely carried by the shaft 81. The bevel gear 85 is driven by a bevel gear 86 on the end of the shaft 68. A yoke-shaped frame 88 is slidably mounted on the shaft 81 and carries the pulley 74. This frame where it surrounds the shaft 81, carries an inwardly projecting element (not shown) adapted to engage right-and-left-hand threads on the shaft 81 and give the frame a longitudinal motion in either direction, according to the well known practice. This relative motion of the frame guides the cord evenly to the bobbin 75.

As the driving shaft 68 rotates the bevel gear wheels 66 and 86 transmit their motion to the respective gear wheels 65 and 85, but the gear ratios are such that the wheel 65 is turned much faster than the wheel 85. The friction clutch 83 between the bevel 85 and the shaft 81 allows slippage as the spool fills and requires slower rotation. The rotation of the frame 62 by the gear 65, twists the cord up to the needle 43, where the strands are formed into the hollow or tubular cord, and at the same time causes the rotation of the grooved pulley 70 in the direction to draw the formed cord downwardly. The amount of the twist is determined by the peripheral speed of the pulley 70 relatively to the rate of rotation of the frame 62.

Having thus described my invention, what I claim is:

1. The method of making hollow cord consisting of treating textile strands with adhesive material and then twisting them into a cord with a hollow center, while maintaining tension on the strands strong enough to keep them taut but light enough to prevent the internal collapse of the resultant cord.

2. The method of making hollow cord consisting of treating textile strands with adhesive, twisting together a number of the strands so treated about a male die and into a coacting female die, the size and position of which are selected to bring each strand into contact with its neighbors while maintaining a hollow center.

3. The method of making hollow cord consisting of twisting sticky strands together about a point while maintaining tension on the strands sufficient to keep them taut but not sufficient to collapse the resultant cord.

4. The process of making hollow cord consisting of twisting adhesive strands together about a point and immediately drawing them into a female die the bore of which is substantially equal to the external diameter of the resultant cord and during such operation maintaining tension on the strands sufficient to keep them taut but not sufficient to collapse the cord being formed.

5. The method of making hollow cord consisting of treating strands with cement and twisting a large enough number of them about a former so that they may successively contact with each other while leaving a hollow center, and during such operation maintaining a tension on the strands great enough to keep them taut but not enough to collapse the cord.

6. The method of making hollow cord consisting of treating strands with cement and twisting them about a point while maintaining a light tension on them and immediately drawing the formed cord through a female die having a bore of such size that each strand contacts with it while each strand is adhering on its opposite sides to its neighboring strands and the center of the cord is hollow.

7. The method of making hollow cord consisting of treating textile strands with rubber cement and thereafter, while maintaining a light tension on the strands, twisting them together about a point located at the mouth of a tubular die which is of such size as to bring the strands each into contact with an adjacent strand while leaving a hollow center.

8. The method of making hollow cord consisting of coating individual strands with rubber cement, drying such cement while still leaving it sticky on the exterior of the strands, and while the strands are in this condition twisting them together about a hollow center.

9. The method of making hollow cord consisting of coating individual strands with cement, drying such cement while still leaving it sticky on the exterior of the strands, and while the strands are in this condition twisting them together about a hollow center, while maintaining tension on the strands sufficient to keep them taut without causing the collapse of the resultant cord.

10. The method of making hollow cord consisting of coating individual strands with rubber cement, drying such cement while still leaving it sticky on the exterior of the strands, and while the strands are in this condition twisting them together about a forming point, which is located at the entrance to a tubular die, the diameter of which is of such size as to hold the strands each in contact with its neighbors while leaving a hollow space at the center of the cord being formed.

11. The method of making hollow cord consisting of coating individual strands with rubber cement, drying such cement while still leaving it sticky on the exterior of the strands, and while the strands are in this condition twisting together a large enough number of them to form a continuous arch about a hollow center and immediately drawing the nascent cord through a tubular die the diameter of which is of such size as to press the strands into close contact with their respective neighbors while leaving a hollow space at the center of the cord being formed, and maintaining on the strands until the cord is completed a tension sufficient to keep them taut but not sufficient to collapse the resultant cord.

12. The method of making hollow cord consisting of impregnating and coating individual strands with rubber cement under pressure, then heating and drying said strands without baking the cement on the exterior thereof, then twisting said strands together about a point and into a female die, the point being located adjacent to the mouth of the die, the bore of the die having a diameter at least three times that of each strand, drawing said cord continuously through such die and winding it onto a spool.

In testimony whereof, I hereunto affix my signature.

JAMES D. TEW.

Correction in Letters Patent No. 1,245,067.

It is hereby certified that in Letters Patent No. 1,245,067, granted October 30, 1917, upon the application of James D. Tew, of Akron, Ohio, for an improvement in "Methods of Making Hollow Cord," an error appears in the printed specification requiring correction as follows: Page 1, line 10, for the patent number "1,444,079" read *1,144,079;* and that the said Letters Patent should be read with this correction therein that the same may conform to the record of the case in the Patent Office.

Signed and sealed this 29th day of January, A. D., 1918.

[SEAL.]

R. F. WHITEHEAD,
*Acting Commissioner of Patents.*

Cl. 28—21.